United States Patent [19]

Inoue et al.

[11] Patent Number: 4,895,233

[45] Date of Patent: Jan. 23, 1990

[54] ELECTROMAGNETIC COUPLING APPARATUS EQUIPPED WITH HEAT PIPES

[75] Inventors: Hitoshi Inoue; Tadatoshi Takayanagi; Kenji Kataoka, all of Kobe; Ryosuki Okita, Himeji; Kiyohide Okamoto, Himeji; Hideaki Takei, Himeji, all of Japan

[73] Assignee: Mitsubishi Denki Kabushiki Kaisha, Japan

[21] Appl. No.: 334,754

[22] Filed: Apr. 5, 1989

Related U.S. Application Data

[63] Continuation of Ser. No. 89,319, Aug. 25, 1987, abandoned.

[30] Foreign Application Priority Data

| Sep. 30, 1986 | [JP] | Japan | 61-233568 |
| Sep. 30, 1986 | [JP] | Japan | 61-233569 |
| Sep. 30, 1986 | [JP] | Japan | 61-233586 |
| Sep. 30, 1986 | [JP] | Japan | 61-233587 |
| Sep. 30, 1986 | [JP] | Japan | 61-233588 |

[51] Int. Cl.$^4$ .................... F16D 37/02; F16D 65/833
[52] U.S. Cl. ........................... 192/21.5; 188/264 CC; 188/267; 192/113 R; 192/113 A
[58] Field of Search .............. 192/21.5, 113 R, 113 A; 188/267, 274, 264 CC

[56] References Cited

U.S. PATENT DOCUMENTS

| 2,672,953 | 3/1954 | Cline | 188/274 |
| 3,262,534 | 7/1966 | Monroe et al. | 192/21.5 X |
| 3,469,665 | 9/1969 | Murata et al. | 192/21.5 |

FOREIGN PATENT DOCUMENTS

| 51-7789 | 3/1976 | Japan . | |
| 51-49478 | 11/1976 | Japan . | |
| 0157841 | 9/1982 | Japan | 188/264 CC |
| 57-181934 | 11/1982 | Japan . | |
| 60-510 | 1/1985 | Japan . | |
| 0129434 | 7/1985 | Japan | 192/113 A |
| 0146925 | 8/1985 | Japan | 192/113 A |
| 0914835 | 3/1982 | U.S.S.R. | 192/113 R |
| 680439 | 10/1952 | United Kingdom | 192/113 R |
| 1213650 | 11/1970 | United Kingdom . | |
| 1413520 | 11/1975 | United Kingdom | 188/264 CC |

Primary Examiner—Rodney H. Bonck
Attorney, Agent, or Firm—Leydig, Voit & Mayer

[57] ABSTRACT

A magnetic particle-type electromagnetic coupling apparatus is cooled by a plurality of heat pipes which are partially embedded in the outer periphery of a rotating coupling member near the portion of the coupling member which is in contact with magnetic particles during operation. Heat is removed from the coupling member by a working fluid which is sealed within the heat pipes and is dissipated to the atmosphere through cooling fins attached to the heat pipes.

14 Claims, 3 Drawing Sheets

ELECTROMAGNETIC COUPLING APPARATUS EQUIPPED WITH HEAT PIPES

This application is a continuation of application Ser. No. 07/089,319, filed Aug. 25, 1987 and now abandoned.

BACKGROUND OF THE INVENTION:

This invention relates to a magnetic particle-type electromagnetic coupling apparatus, and more particularly to an improved electromagnetic coupling apparatus which is cooled by heat pipes.

A magnetic particle-type electromagnetic coupling apparatus employs magnetic particles to transmit torque between a drive rotor and a driven rotor. Magnetic particles are disposed between opposed surfaces of the drive rotor and the driven rotor. When the magnetic particles are not magnetized, the drive rotor and driven rotor can rotate freely with respect to one another, but when the magnetic particles are magnetized by an external magnetic field, the magnetic particles become substantially a solid mass and can transmit torque from the drive rotor to the driven rotor. Therefore, if the two rotors are rotatably supported, an electromagnetic coupling apparatus can be employed as a clutch, while if one rotor is free to rotate while the other is held stationary, it can be used a braking mechanism for the rotating member.

During the operation of a magnetic particle-type electromagnetic coupling apparatus, slippage may take place between the magnetic particles and the surfaces of the drive rotor and driven rotor which the particles contact. Due to this slippage, a great deal of frictional heat is generated, and if this heat is not somehow removed, the magnetic particles and the rotors will reach an extremely high temperature. In addition to possibly damaging the rotors, this high temperature may cause the magnetic particles to become sintered through oxidation, as a result of which they lose their ability to function as a coupling medium. Accordingly, a magnetic particle-type electromagnetic coupling apparatus is equipped with a cooling device for cooling the magnetic particles and the surfaces of the rotors to prevent an excessive rise in temperature.

For example, Japanese Published Utility Model No. 51-49478 discloses an electromagnetic coupling apparatus in which a coolant such as water or oil is made to circulate through an annular coolant passageway formed within a drive rotor. The coolant is supplied to the drive rotor from an external coolant supply via coolant supply and a pump to circulate the coolant. which is connected to the drive rotor. After the coolant is circulated once through the coolant passageway, it is returned to the coolant supply. However, that apparatus has the disadvantages that it requires an external coolant supply and a pump to circulate the coolant. Furthermore, because of the necessity of forming coolant passageways in the drive rotor and the drive shaft, these members are difficult and expensive to manufacture. In addition, the apparatus requires periodic maintenance to prevent the leakage of the coolant. It therefore has a number of serious drawbacks.

An alternative means of cooling an electromagnetic coupling apparatus is a heat pipe. Japanese Published Utility Model No. 60-510 discloses a magnetic particle-type brake having a heat pipe which extends longitudinally from the center of a drive rotor. However, as heat is generated along the outer periphery of the drive rotor, the centrally-located heat pipe is too far remote from the source of heat to provide any significant cooling effect.

Japanese Utility Model Laid-Open No. 57-181934 discloses an electromagnetic coupling apparatus which employs two heat pipes, one of which is embedded in the center of a drive rotor and the other of which is embedded in the center of a driven shaft. However, even though the heat pipes are disposed near the source of heat, because the heat pipes are embedded, they must have small dimensions and the areas of the surfaces through which heat exchange takes place are accordingly small, so that an adequate cooling effect can not be obtained.

SUMMARY OF THE INVENTION:

Accordingly, it is an object of the present invention to provide a magnetic particle-type electromagnetic coupling apparatus which can be adequately cooled and which does not require an external coolant supply.

It is another object of the present invention to provide a magnetic particle-type electromagnetic coupling apparatus which has a simple structure.

It is still another object of the present invention to provide a magnetic particle-type electromagnetic coupling apparatus which is inexpensive to manufacture.

It is yet another object of the present invention to provide a magnetic particle-type electromagnetic coupling apparatus which is not subject to coolant leaks.

A magnetic particle-type electromagnetic coupling apparatus in accordance with the present invention has a cup-shaped first coupling member which surrounds a disk-shaped second coupling member and which is separated therefrom by an annular gap. Magnetic particles are disposed between the opposed surfaces of the two coupling members in the annular gap. The first coupling member is secured to a rotating drive shaft while the second coupling member is either secured to a rotatably-supported driven shaft or is secured to a stationary member. The coupling apparatus is cooled by a plurality of longitudinally-extending heat pipes which are partially embedded in the outer periphery of the first or second coupling member near the portion thereof which contacts the magnetic particles. The outer ends of the heat pipes which protrude from the first or second coupling member have cooling fins mounted thereon. The apparatus may be further equipped with a cooling fan for blowing cooling air over the cooling fins during operation.

A coupling apparatus in accordance with the present invention may be in the form of a clutch, in which case both of the coupling members are able to rotate, or it may be in the form of a braking device, in which case the first coupling member is able to rotate and the second coupling member is fixed.

BRIEF DESCRIPTION OF THE DRAWINGS:

In the figures, the same reference numerals indicate the same or corresponding parts.

Figure 1:
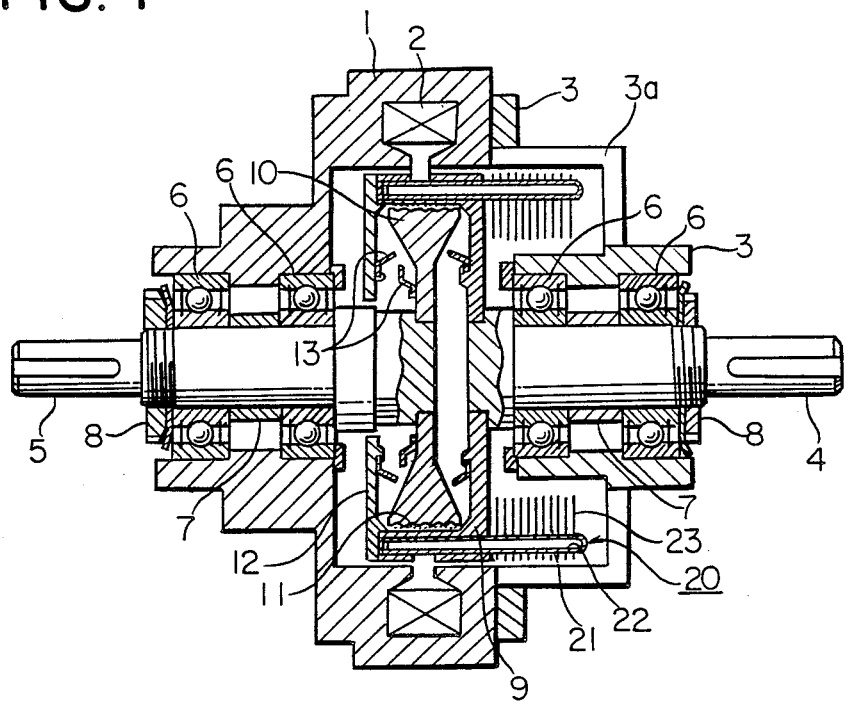
FIG. 1 is a longitudinal cross-sectional view of a first embodiment of an electromagnetic coupling apparatus in accordance with the present invention.

DESCRIPTION OF THE PREFERRED EMBODIMENTS:

Hereinbelow, a number of preferred embodiments of a magnetic particle-type electromagnetic coupling apparatus in accordance with the present invention will be described while referring to the accompanying drawings, FIG. 1 of which illustrates a first embodiment in the form of a clutch. As shown in this figure, a generally cup-shaped stator 1 houses an exciting coil 2 which is electrically connected to an unillustrated electrical power supply. A protective housing 3 having a plurality of window portions 3a for ventilating air formed in its outer periphery is secured to one side of the stator 1 by unillustrated bolts or other suitable means. The protective housing 3 rotatably supports a rotating drive shaft 4 through a pair of ball bearings 6 which are mounted therein, while the stator 1 rotatably supports a driven shaft 5 through another pair of ball bearings 6. The drive shaft 4 is connected to an unillustrated motor, while the driven shaft 5 is connected to an unillustrated load. The two ball bearings 6 of each pair are separated by tubular spacers 7. The ball bearings 6 are restrained from longitudinal movement by retaining nuts 8 which screw onto external threads formed on the drive shaft 4 and the driven shaft 5. A cup-shaped first coupling member 9 having a cylindrical inner peripheral surface is rigidly secured to the inner end of the drive shaft 4 so as to rotate therewith. The first coupling member 9 surrounds an annular second coupling member 10 which is rigidly secured to the inner end of the driven shaft 5 and which has a cylindrical outer peripheral surface. The cylindrical inner peripheral surface of the first coupling member 9 and the cylindrical outer peripheral surface of the second coupling member 10 are separated by an annular gap which is filled with magnetic particles 11. An annular end plate 12 is secured to the open end of the first coupling member 9 so as to enclose the second coupling member 10. A plurality of baffles 13 which are made of a non-magnetic material are secured to the sides of the first coupling member 9, the second coupling member 10, and the end plate 12.

Figure 2:
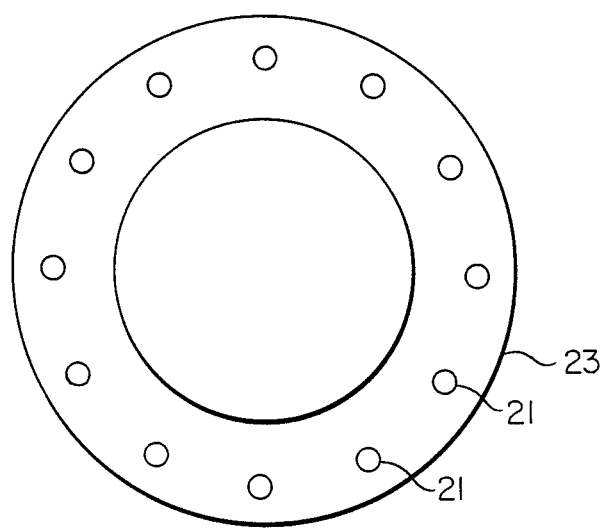
FIG. 2 is a front view of one of the cooling fins of the embodiment of FIG. 1.

A plurality of longitudinally-extending holes are formed in the first coupling member 9 at regular intervals along the outer periphery thereof, and a plurality of heat pipes 20 each have one end embedded in a corresponding one of the holes. Each of the heat pipes 20 is formed from a cylindrical sealed pipe 21 containing a volatile working fluid such as alcohol, ammonia, or water under a reduced pressure. The outer ends of the sealed pipes 21 are equipped with a plurality of cooling fins 23 which are secured thereto. Separate cooling fins 23 can be employed for each heat pipe 20, but preferably, the cooling fins 23 are annular members like the one shown in FIG. 2 having a plurality of regularly-spaced holes formed therein through which all the sealed pipes 21 pass. Annular cooling fins 23 of this type have the advantages that they have an increased surface area and that they restrain the heat pipes 20 against centrifugal force as the heat pipes 20 rotate with the first coupling member 9 and therefore increase the mechanical strength of the apparatus. The cooling fins 23 are disposed in the vicinity of the window portions 3a of the protective housing 3.

The operation of the illustrated embodiment is as follows. When current is supplied to the exciting coil 2, a magnetic flux is generated which magnetizes the magnetic particles 11. When magnetized, the particles 11 become substantially a solid mass and transmit the rotation of the first coupling member 9 to the second coupling member 10, which in turn transmits the rotation to the driven shaft 5 so that rotational force is transmitted from the drive shaft 4 to the driven shaft 5. When the current to the exciting coil 2 is cut off, the magnetic particles 11 no longer transmit torque, and the driven shaft 5 can rotate freely with respect to the drive shaft 4.

When the magnetic particles 11 are in a magnetized state and slippage takes place between the first coupling member 9, the second coupling member 10, and the magnetic particles 11, frictional heat is generated. This heat is removed by the heat pipes 20. Namely, the heat which is generated by the first coupling member 9 is transmitted to the inner end of the sealed pipes 21 which are embedded therein, causing the working fluid 22 which is sealed therein to be heated and vaporized. In evaporating, the working fluid 22 absorbs heat and directly cools the outer periphery of the first coupling member 9. At the same time, through the first coupling member 9, the working fluid 22 indirectly cools the magnetic particles 11 and the second coupling member 10. The vaporized working fluid 22 flows towards the outer ends of the sealed pipes 21, which are in contact with the external air. There, the working fluid 22 condenses, giving up the heat of condensation to the surrounding air via the cooling fins 23. The liquefied working fluid 22 then returns to the inner end of the sealed pipes 21, where it is again heated and vaporized.

By the repetition of the above cycle, heat is continuously transferred from the inner ends of the sealed tubes 21 which are embedded in the first coupling member 9 to the outer ends thereof and released into the atmosphere, so that the coupling members 9 and 10 and the magnetic particles 11 are prevented from reaching a high temperature. Thus, the coupling members 9 and 10 are protected from thermal damage, and the magnetic particles 11 are protected from being sintered. The cooling effect is particularly good since the heat pipes 20 are disposed in the vicinity of the outer peripheral surface of the first coupling member 9 where frictional heat is generated. Furthermore, because the heat pipes 20 rotate together with the first coupling member 9, there is relative movement between the air and the outer ends of the sealed pipes 21 and the cooling fins 23, resulting in a high rate of heat transfer from the heat pipes 20 to the atmosphere and further increasing the cooling effect.

In the embodiment of FIG. 1, the heat pipes 20 extend from only one side of the first coupling member 9, but it is also possible to have the sealed pipes 21 of the heat pipes 20 extend through both the first coupling member 9 and the end plate 12 and to provide cooling fins 23 on both ends thereof, thereby increasing the cooling effect provided by the heat pipes 20.

Figure 3:
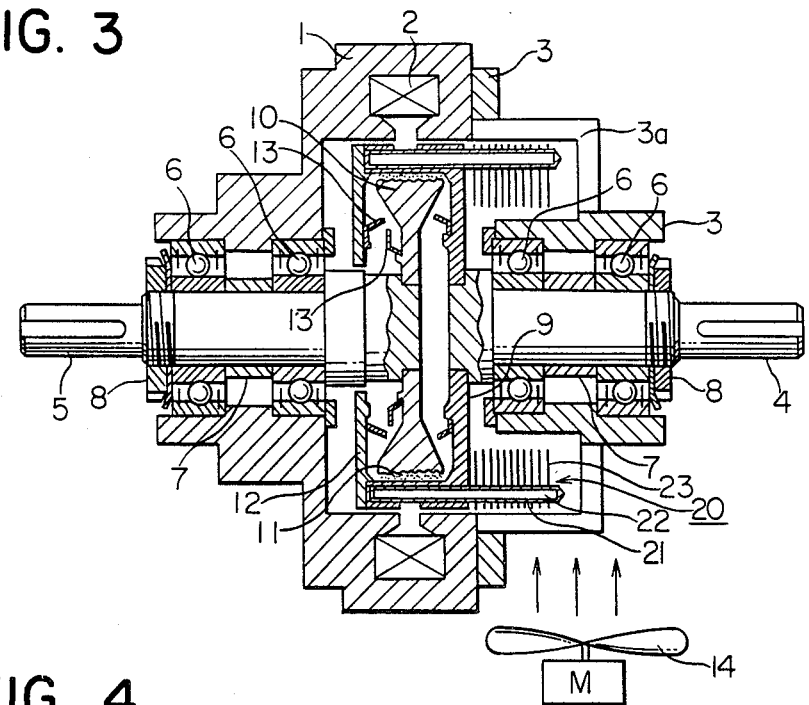
FIG. 3 is a longitudinal cross-sectional view of a second embodiment of the present invention which is further equipped with a cooling fan.

FIG. 3 illustrates a second embodiment of the present invention which is further equipped with a cooling fan 14 which is disposed in the vicinity of the window portions 3a of the protective housing 3 so as to blow cooling air over the heat pipes 20. The structure of this embodiment is otherwise identical to that of the previous embodiment, and it operates in the same manner. By blowing cooling air over the heat pipes 20 during the operation of the apparatus, the cooling effect provided by the heat pipes 20 can be even further increased.

Figure 4:
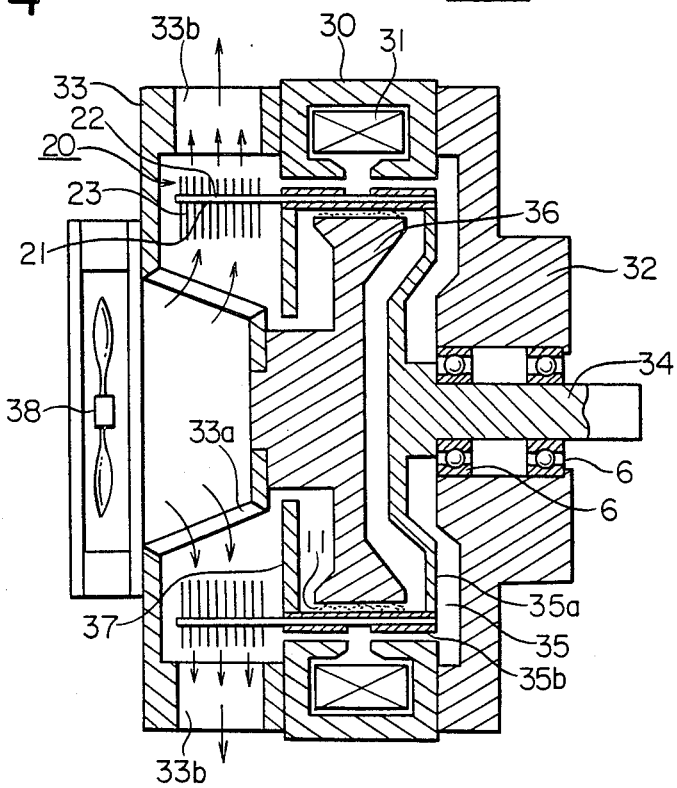
FIG. 4 is a longitudinal cross-sectional view of a third embodiment of present invention in the form of a brake.

In the previous two embodiments, a coupling apparatus in accordance with the present invention was in the form of a clutch. FIG. 4 illustrates a third embodiment in which the present invention is employed as a braking device. In this embodiment, as shown in FIG. 4, a stator 30 houses an exciting coil 31 which is electrically connected to an unillustrated power supply. A first and a second protective housing 32 and 33 are secured to opposite sides of the stator 30. The first protective housing 32 rotatably supports a longitudinally-extending drive shaft 34 through a pair of ball bearings 6 which are mounted therein. The second protective housing 33 has a plurality of suction ports 33a for cooling air formed in its end surface and a plurality of discharge ports 33b formed in its outer periphery. A cooling fan 38 is mounted on the front of the second protective housing 33 so as to blow cooling air into the housing 33 through the inlet ports 33a. A cup-shaped first coupling member 35 is secured to the inner end of the drive shaft 34. It comprises a disk-shaped portion 35a which is integral with the inner end of the drive shaft 34 and a longitudinally-extending cylindrical connecting portion 35b which is secured to the outer periphery of the disk-shaped portion 35a. The connecting portion 35b has a plurality of longitudinally-extending through holes formed therein at regular intervals along its circumference, and heat pipes 20 which are identical to the heat pipes 20 of the previous embodiments are partially embedded in the through holes. The cooling fins 23 of the heat pipes 20 are disposed inside the second housing 33 between the ports 33a and the discharge ports 33b.

The first coupling member 35 surrounds a disk-shaped second coupling member 36 which is rigidly secured to the second protective housing 33 and has a cylindrical outer peripheral surface. The cylindrical inner peripheral surface of the connecting portion 35b of the first coupling member 35 is separated from the cylindrical outer peripheral surface of the second coupling member 36 by an annular gap which is filled with magnetic particles 11. An annular end plate 37 which surrounds the second coupling member 36 is secured to the open end of the first coupling member 35.

The operation of this embodiment is similar to that of the previous embodiments. When a current is passed through the exciting coil 31, the magnetic flux which is generated magnetizes the magnetic particles 11 and causes them to harden into a substantially solid mass, and if the drive shaft 34 is rotating, a torque is transmitted from the first coupling member 35 to the second coupling member 36 by the magnetic particles 11. However, as the second coupling member 36 is prevented from rotating, the second coupling member 36 exerts a braking force on the first coupling member 35 through the magnetic particles 11, and the first coupling member 35 and the drive shaft 34 are brought to a halt. The heat pipes 20 function in exactly the same manner as in the previous embodiments, directly cooling the first coupling member 35 while indirectly cooling the second coupling member 36 and the magnetic particles 11. The cooling effect of the heat pipes 20 is increased by the cooling air which is blown into the inlet ports 33a, past the cooling fins 23, and out the discharge ports 33b.

Figure 5:
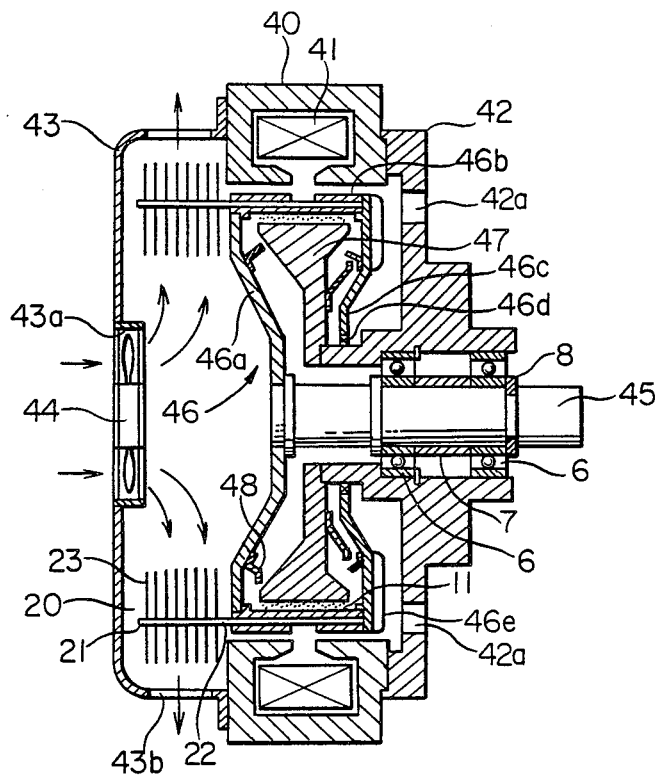
FIG. 5 a longitudinal cross-sectional view of a fourth embodiment of the present invention, also in the form of a brake.

FIG. 5 illustrates a fourth embodiment of the present invention which is also used as a braking device. Like the previous embodiment, it has a stator 40 which houses an exciting coil 41 which is electrically connected to an unillustrated power supply. A first protective housing 42 and a second protective housing 43 are secured to opposite sides of the stator 40 by unillustrated bolts or other means. The first protective housing 42 has a plurality of window portions 42a formed in its end surface through which cooling air can pass. It rotatably supports a longitudinally-extending drive shaft 45 through a pair of ball bearings 6 which are mounted therein and which are separated by a tubular spacer 7. The second protective housing 43 has a inlet port 43a for cooling air formed at the center of its end surface and a plurality of discharge ports 43b formed in its outer periphery. A cooling fan 44 is mounted in the inlet port 43a and serves to draw cooling air through the inlet port 43a and discharge it through the discharge ports 43b. A first coupling member 46 is rigidly secured to the inner end of the drive shaft 45 so as to rotate therewith. It comprises a disk-shaped member 46a which is secured to the inner end of the drive shaft 45 by welding, a longitudinally-extending cylindrical connecting portion 46b which is secured to the outer periphery of the disk-shaped portion 46a, and an annular end plate 46c which is secured to the other end of the connecting portion 46b. A seal member 46d which is in sliding contact with the drive shaft 45 is secured to the inner peripheral surface of the end plate 46c. A plurality of cooling fins 46e are mounted on the outer surface of the end plate 46c. As the first coupling member 46 rotates, the cooling fins 46e draw cooling air through the window portions 42a so as to cool the inside of the apparatus. The cylindrical connecting portion 46b has a plurality of longitudinally-extending through holes formed therein at regular intervals along its circumference. A plurality of heat pipes 20 are partially embedded in these through holes in the same manner as in the previous embodiment. An annular second coupling member 47 is disposed inside the first coupling member 46 surrounding the drive shaft 45 and is rigidly secured to the first protective housing 42. It has a cylindrical outer peripheral surface which is separated from the cylindrical inner peripheral surface of the first coupling member 46 by an annular gap which is filled with magnetic particles 11. A plurality of baffles 48 are secured to the opposed surfaces of the first coupling member 46 and the second coupling member 47.

The operation of this embodiment is identical to that of the previous embodiment, and the heat pipes 20 provide the same cooling effects. This embodiment has the advantage over the previous embodiment that the second coupling member 47 is supported by the first protective housing 42, while the second protective housing 43 supports only the cooling fan 44. Therefore, the second protective housing 43 can have very thin walls, and the overall weight of the apparatus can be reduced.

Although in the above-described embodiments, the heat pipes are mounted on the first coupling member, they may be likewise mounted on the second coupling member.

As can be seen from the above description, as an electromagnetic coupling apparatus in accordance with the present invention is cooled by heat pipes, there is no need for an external coolant supply or for a pump to circulate coolant through the apparatus. Furthermore, there is no need to form coolant passageways within the apparatus, so the structure and manufacture of the apparatus are simplified. In addition, since a working fluid is completely sealed within the heat pipes, there is no possibility of coolant leaks, and therefore the cooling mechanism for the coupling apparatus is virtually maintenance-free.

What is claimed is:

1. A magnetic particle-type electromagnetic coupling apparatus comprising:
   a rotatable drive shaft;
   a first coupling member secured to said rotatable drive shaft and including only one cylindrical coupling surface, said coupling surface being disposed generally parallel to an axis of said drive shaft for rotating therewith;
   a second coupling member having a cylindrical coupling surface disposed opposite and radially inwardly from said cylindrical coupling surface of said first coupling member across an annular gap;
   magnetic particles disposed in said annular gap for transmitting force from said first coupling member to said second coupling member when magnetized;
   a stator surrounding said first coupling member;
   an exciting coil housed inside said stator to magnetize said magnetic particles when an electrical current is passed through said exciting coil;
   a plurality of heat pipes partially embedded in said first coupling member proximate said cylindrical coupling surface of said first coupling member and extending outside of said first coupling member; and
   a protective housing secured to said stator surrounding said heat pipes, said protective housing having a plurality of openings formed therein proximate said heat pipes for the passage of cooling air.

2. A coupling apparatus as claimed in claim 1 wherein each of said heat pipes comprises:
   a sealed cylindrical pipe, one end of which is embedded in said first coupling member and the other end of which extends longitudinally to the outside thereof;
   a volatile working fluid sealed within said sealed pipe under a reduced pressure; and
   a plurality of cooling fins secured to said other end of said sealed pipe.

3. A coupling apparatus as claimed in claim 2 wherein each of said cooling fins is an annular member secured to all of said sealed pipes.

4. A coupling apparatus as claimed in claim 1 wherein said second coupling member is stationary.

5. A coupling apparatus as claimed in claim 1 further comprising a rotatably supported driven shaft secured to said second coupling member so as to be driven thereby when said second coupling member is rotated.

6. A coupling apparatus as claimed in claim 1 further comprising a cooling fan for blowing cooling air through said openings over said heat pipes.

7. A coupling apparatus as claimed in claim 6 wherein said openings comprise inlet opening and a discharge opening, said cooling fins being disposed between said inlet opening and said discharge opening, said cooling fan being mounted on said protective housing in the vicinity of said inlet opening.

8. A magnetic particle-type electromagnetic coupling apparatus comprising:
   a rotatable drive shaft;
   a first coupling member secured to said rotatable drive shaft and having only one cylindrical coupling surface generally parallel to an axis of said drive for rotating therewith;
   a second coupling member including only one cylindrical coupling surface, said coupling surface of said second coupling member being disposed opposite and radially inwardly from said cylindrical coupling surface of said first coupling member across an annular gap;
   magnetic particles disposed in said annular gap for transmitting force from said first coupling member to said second coupling member when magnetized;
   a stator surrounding said first coupling member;
   an exciting coil housed inside said stator to magnetize said magnetic particles when an electrical current is passed through said exciting coil;
   a plurality of heat pipes partially embedded in said first coupling member proximate said cylindrical coupling surface of said first coupling member and extending outside of said first coupling member; and
   a protective housing secured to said stator surrounding said heat pipes, said protective housing having a plurality of openings formed therein proximate said heat pipes for the passage of cooling air.

9. A coupling apparatus as claimed in claim 8 wherein each of said heat pipes comprises:
   a sealed cylindrical pipe, one end of which is embedded in said second coupling member and the other end of which extends longitudinally to the outside thereof;
   a volatile working fluid sealed within said sealed pipe under a reduced pressure; and
   a plurality of cooling fins secured to said other end of said sealed pipe.

10. A coupling apparatus as claimed in claim 9 wherein each of said cooling fins is an annular member secured to all of said sealed pipes.

11. A coupling apparatus as claimed in claim 8 wherein said second coupling member is stationary.

12. A coupling apparatus as claimed in claim 8 further comprising a rotatably supported driven shaft secured to said second coupling member so as to be driven thereby when said second coupling member is rotated.

13. A coupling apparatus as claimed in claim 8, further comprising a cooling fan for blowing cooling air through said openings over said heat pipes.

14. A coupling apparatus as claimed in claim 13, wherein said openings comprise an inlet opening and a discharge opening, said cooling fins being disposed between said inlet opening and said discharge opening, said cooling fan being mounted on said protective housing in the vicinity of said inlet opening.

* * * * *